United States Patent
Covington et al.

[11] Patent Number: 6,031,749
[45] Date of Patent: Feb. 29, 2000

[54] UNIVERSAL POWER MODULE

[75] Inventors: John Henry Covington, Carrollton; Thomas Edwin Walsh, Farmers Branch; John Mark Newell, Denton, all of Tex.

[73] Assignee: Vari-Lite, Inc., Dallas, Tex.

[21] Appl. No.: 09/283,141

[22] Filed: Mar. 31, 1999

[51] Int. Cl.[7] .................................................. H02M 5/458
[52] U.S. Cl. .............................................. 363/98; 363/132
[58] Field of Search ................................ 363/16, 17, 34, 363/37, 40, 41, 95, 97, 98, 131, 132; 318/811

[56] References Cited

U.S. PATENT DOCUMENTS

| | | | |
|---|---|---|---|
| 5,006,973 | 4/1991 | Turner | 363/34 |
| 5,172,009 | 12/1992 | Mohan | 307/46 |
| 5,323,088 | 6/1994 | Cunningham . | |
| 5,355,024 | 10/1994 | Elliott et al. | 307/73 |
| 5,400,237 | 3/1995 | Flanagan et al. | 363/41 |
| 5,475,296 | 12/1995 | Vinsant et al. . | |
| 5,506,480 | 4/1996 | Carlson et al. . | |
| 5,621,627 | 4/1997 | Krawchuk et al. . | |
| 5,640,061 | 6/1997 | Bornhorst et al. | 307/150 |
| 5,646,490 | 7/1997 | Carson et al. . | |
| 5,661,643 | 8/1997 | Blakely et al. . | |
| 5,675,480 | 10/1997 | Stanford . | |
| 5,703,456 | 12/1997 | Cox | 318/701 |
| 5,717,601 | 2/1998 | Farthing . | |
| 5,719,474 | 2/1998 | Vitello . | |
| 5,798,619 | 8/1998 | Covington | 315/307 |
| 5,844,397 | 12/1998 | Konecny et al. | 318/811 |
| 5,875,087 | 2/1999 | Spencer et al. | 361/87 |
| 5,909,098 | 6/1999 | Konecny et al. | 318/811 |
| 5,956,244 | 9/1999 | Rehm et al. | 363/70 |

FOREIGN PATENT DOCUMENTS 9909351  2/1990  WIPO .

*Primary Examiner*—Adolf Denske Berhane
*Attorney, Agent, or Firm*—Hughes & Luce, L.L.P.

[57] ABSTRACT

A switch-mode power converter uses a digital signal processor (DSP) to control operation of power semiconductors through gate drive amplifiers, further using the DSP's internal analog-to-digital converters to measure necessary currents, voltages and timings within the main power circuit. Using values captured by the A-to-D converters, software controlling the DSP manipulates duty cycle and timing parameters of the main semiconductor switches to provide at least three different modes of operation for serving a wide range of lighting loads. This power system reduces the size, cost, and weight, of circuitry needed to operate stage lighting equipment. The DSP's microprocessor eliminates most of the complex and dedicated analog circuitry commonly used for electronic power conversion, and a common power circuit topology provides an identical hardware platform for each luminaire circuit. Overall reliability is enhanced because of the reduction in circuit complexity.

29 Claims, 10 Drawing Sheets

UNIVERSAL POWER MODULE

FIELD OF THE INVENTION

The present invention relates to electric power converters, and particularly to a switch-mode power converter using a digital signal processor.

DESCRIPTION OF RELATED ART

Power supplies for energizing electric lamp loads take different forms depending upon the characteristics of the load and, to some extent, the characteristics of the electric energy source. Incandescent lamps are frequently provided with a regulated voltage that can be varied to control the intensity of light output from the lamp. Some power supplies provide a regulated current that can also be varied to control lamp intensity. Modern electric arc lamps frequently require regulated power output wherein the current through the lamp is regulated in dependence upon the voltage across the arc. A particular lamp power supply is usually designed for a specific application and is generally not adaptable to a different application.

A stage lighting system described in U.S. Pat. No. 5,640,061 includes a modular lamp power supply apparatus in which an electrical chassis receives lamp power supply modules in dependence upon specific lamp loads connected thereto, the modules being configured to provide appropriately regulated electrical energy to each corresponding lamp. The modules can be removed and replaced when the arrangement of lamp loads is changed, such as at the end of one show and the beginning of another and in consequence of re-ordering the lighting instruments for implementing a new lighting design.

Prior power module designs suffer from two interrelated problems. First, prior modules are inefficient with energy. A large amount of energy is converted to heat in the regulation process. This leads to significant heat dissipation problems. Because large amounts of heat must be dissipated, the modules are large and bulky. This is the second problem. Another limitation in prior power modules is their lack of flexibility. Differing light sources require different types of power regulation. Prior techniques allow for limited changes in operational modes and parameters. There is a need for a power source for lighting having the flexibility to deal with all lighting types.

SUMMARY OF THE INVENTION

The present invention provides an electric power converter having plural modes of operation for energizing lamps in regulated voltage mode or regulated current mode, or for energizing lamps in a regulated power mode.

In accordance with the preferred embodiment, a switch-mode power converter uses a digital signal processor (DSP) to control operation of power semiconductors through gate drive amplifiers, further using the DSP's internal analog-to-digital converters to measure necessary currents, voltages and timings within the main power circuit. Using values captured by the A-to-D converters, software controlling the DSP manipulates duty cycle and timing parameters of the main semiconductor switches to provide at least three different modes of operation for serving a wide range of lighting loads and provides continuously-variable power, current, or voltage for the loads. Operational software for the DSP sets operating parameters and may be downloaded from a system controller via a data link to configure the power converter. Status of the power converter may be uploaded via the data link to the system controller.

An input rectifier provides pulsating, unipolar current to a buck converter that serves as a universal power conversion circuit providing an open-circuit voltage roughly equivalent to the peak voltage of the AC line. A relatively large series inductor may be provided to limit the rate of rise of current allowing for slower response from the control network, and further allowing simplified software and hardware. An output commutating bridge changes the polarity of the output current as needed, providing an AC voltage for most loads. The current commutation, performed by the output bridge under software control, may be synchronized with the input line zero crossings, with other power converters, or with other events. A switched input filter capacitor smooths the pulsating DC for loads requiring a non-pulsating excitation, such as arc lamps or loads requiring smooth DC current. The capacitor can be disconnected from the circuit by the DSP to allow for power factor correction in constant voltage or constant current drives.

The power system of the preferred embodiment reduces the size, cost, and weight of circuitry needed to operate a stage lighting system with different lamp loads. The DSP's microprocessor eliminates most of the complex and dedicated analog circuitry commonly used for electronic power conversion, and a common power circuit topology provides an identical hardware platform for each luminaire circuit. Overall reliability is enhanced because of the reduction in circuit complexity.

DETAILED DESCRIPTION

Figure 1:
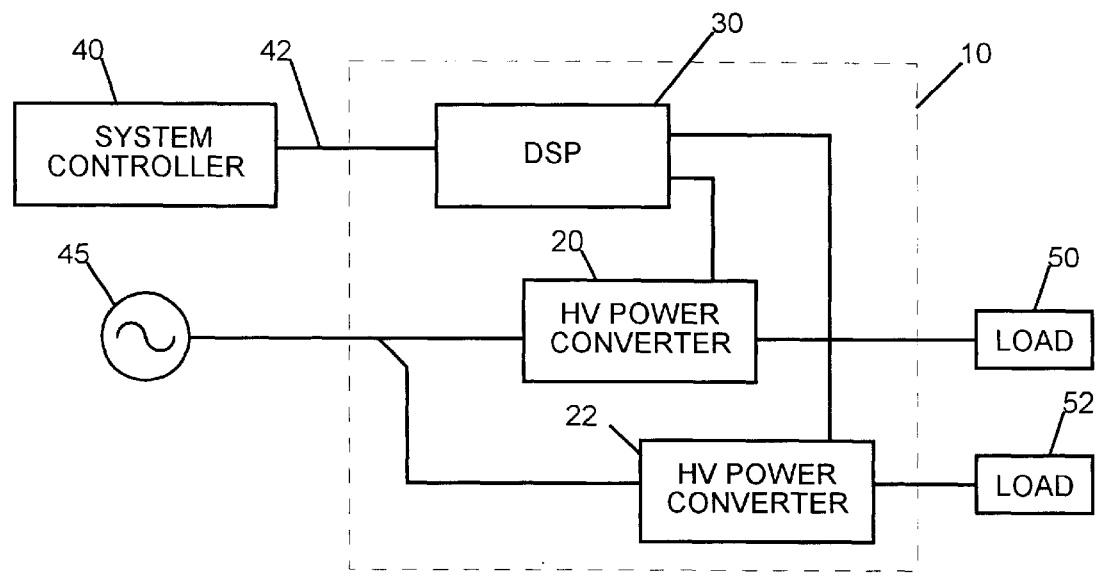
FIG. 1 is a block diagram of an electric power converter system according to a preferred embodiment.

FIG. 1 is a block diagram of a preferred embodiment of the present invention. An electric power converter module 10 includes a high-voltage power converter section 20, a second high-voltage power converter section 22, and a low-voltage control section 30 utilizing a Digital Signal Processor (DSP) device. Module 10 is configured as a pair of variable lamp power supplies controlled by a single control section. Module 10 is connected to a system controller 40 by a bi-directional serial digital data link 42. Each high-voltage power converter section 20 and 22 is fed from the same phase of an electric power source 45, which may be a three-phase alternating current electric power source, preferably in the range of 208–277 Vac. Each high-voltage power converter section 20 and 22 provides regulated electric power to its own respective load 50 or 52. Additional power converter modules (not shown) may be connected to the system controller via additional branches of the digital data link. The additional modules may be connected to the same electric power source. However, the various pairs of high-voltage power converter sections should be evenly distributed over all three phases of a three-phase source.

Figure 2:
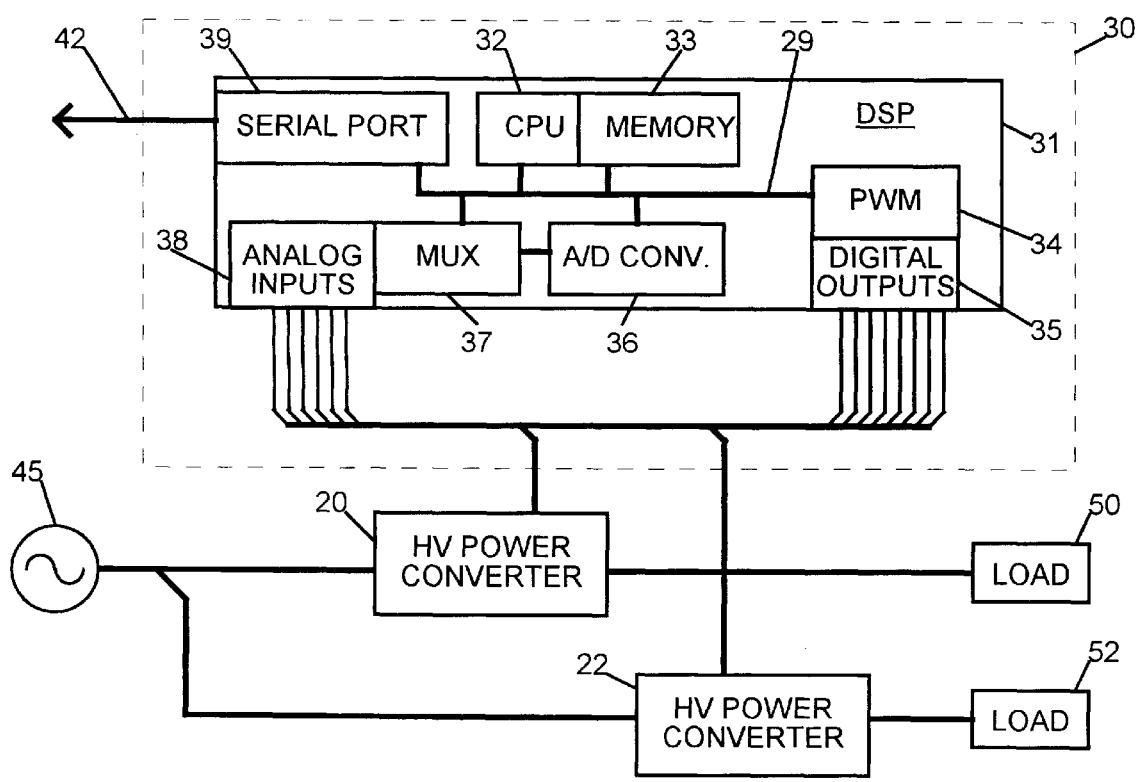
FIG. 2 is a block diagram of an electric power converter module.

FIG. 2 is a schematic diagram showing low-voltage control section 30 of module 10. According to a preferred embodiment, low-voltage section 30 comprises a Digital Signal Processor (DSP) device 31. An example of a suitable DSP is the TMS320C24x provided by Texas Instruments Incorporated. DSP 31 includes a Central Processing Unit (CPU) 32 and associated memory 33. A digital Pulse Width Modulator (PWM) 34 with plural outputs 35, an Analog-to-Digital Converter (ADC) 36 with a multiplexer (MUX) 37 for connecting one of a plurality of analog inputs 38 to ADC 36 are also included. Finally, a serial port receiver/transmitter circuit 39 for bi-directional serial data communications with a system controller 40, and an internal digital bus system 29 for carrying address, data and control signals between and among the sub-sections of the DSP device is provided. The DSP device receives command signals from the system controller 40, interprets those command signals and operates the high-voltage power converter sections 20 and 22 in accordance with an executable program stored in memory 33. Memory 33 is preferably a combination of random access memory (RAM) and electrically erasable programmable read-only memory (EEPROM). The operating program for DSP 31 is programmed into EEPROM. The EEPROM provides non-volatile storage, but may be reprogrammed with updated, modified or improved software. The RAM is used for temporary storage of gathered information and intermediate results of calculations and processes.

Each high-voltage power converter section 20 and 22 is identical and operates off the same phase as the other section in a pair. However, each section receives its own individual control signals from the DSP device 31 and generates its own individual electrical parameter sense signals. This allows for each section to be operated in a different mode as required by the particular loads connected thereto. Converter section 20, shown in FIG. 3, includes a high-speed electronic switch such as a field-effect transistor (FET) Q1, a series inductor L1, a "free-wheeling" diode D1, and an H-bridge output circuit comprising transistors Q2–Q5. In this embodiment, transistors Q2–Q5 are bipolar transistors. However, any controllable conductive device may be used. An alternating current source voltage $V_S$ is applied to a full-wave bridge rectifier BR1, and the rectified voltage $V_B$ is applied to the FET switch Q1. The switch Q1 is pulse-width modulated, and together with inductor L1 and diode D1 form a buck converter that regulates electrical energy supplied to a load 50 through the H-bridge output circuit Q2–Q5. A digital signal processor (DSP) 31 controls operation of the switch Q1 and the H-bridge output circuit Q2–Q5.

An alternating current source voltage $V_S$, preferably in the range of 208–277 Vac, is applied at input terminals AC HI and AC LO. The input portion of the high-voltage power converter section may include series current-limiting devices CL1 and CL2, such as negative-temperature-coefficient (NTC) inrush current limiters or NTC thermistors. The output terminals of current-limiting devices CL1 and CL2 are connected to a two-pole circuit breaker and an EMI/RFI filter 23. Alternatively, protective devices may be included in a higher-level chassis assembly such as described in U.S. Pat. No. 5,640,061, which is incorporated herein by reference. Diodes D2 and D3 are provided to sense the amplitude of the source voltage $V_S$ as described hereinafter.

Source voltage $V_S$ is rectified by rectifier BR1, the positive output $V_B$ being applied to switch Q1 while the negative output thereof is referenced as an isolated "delta" ground 21, typically at 170 volts or more below "earth" ground. Switch Q1 is preferably a high-speed, high-capacity field effect transistor. A large-value capacitor C1, having an insignificant reactance at the line frequency of the alternating current voltage source $V_S$ (for example, 330 to 1,000 microfarads). Capacitor C1 may comprise a bank of parallel-connected electrolytic capacitors or similar charge-storing devices. Capacitor C1 has one terminal connected to delta ground 21 and the other terminal connected through the contacts of a controllable switch such as relay K1 to $V_B$. The capacitor C1 is connected to $V_B$ in some modes of operation to provide a filtered direct current supply voltage to switch Q1. In other modes of operation, the relay K1 is open to disconnect the capacitor C1 from $V_B$.

Switch Q1, inductor L1, and diode D1, comprise a buck converter that operates conventionally in a known manner as described, for example in U.S. Pat. No. 5,640,061; or U.S. Pat. No. 5,798,619, which are hereby incorporated by reference. When switch Q1 is closed, the current through inductor L1 creates a magnetic field. When switch Q1 is then opened, the magnetic field collapses causing current that is pulled through diode D1. Switch Q1 is pulse-width modulated to provide a current pumping action that provides the desired output power level.

The output of the buck converter is applied to an H-bridge composed of switches Q2–Q5. The H-bridge allows control of the application of power as is explained below. A low resistance value resistor R1 is provided in the return path between the H-bridge and delta ground 21, which allows for current sensing as described hereinafter. Although Q1 and L1 are shown in series with the positive output of BR1, the system could also be constructed in reverse polarity with Q1 and L1 in series with the negative output of BR1.

The H-bridge, including switches Q2–Q5, can be operated as an inverter to provide an alternating current output with switches Q2 and Q5 alternating conduction with switches Q3 and Q4 to reverse polarity of the output voltage across the load. Alternatively, in another mode of operation, one half of the bridge can be turned on and the other half of the bridge turned off to provide a direct current output of either polarity to the load. Switches Q2–Q5 are preferably insulated-gate bipolar transistors (IGBT). Gate drive amplifiers A1–A5 are provided to drive transistors Q1–Q5, respectively, and preferably provide level shifting between a high-voltage power converter and a low-voltage control section. Integrated circuits that provide this function are well known in the art.

The electrical parameters of power converter 20 are sensed via differential amplifiers A6–A8. Differential amplifiers A6–A8 are commercially available integrated circuits having a sufficiently high common-mode rejection ratio (CMRR) to avoid common-mode induced errors. The output signals of differential amplifiers A6–A8 are scaled to facilitate direct conversion by the DSP's analog-to-digital converter 36 (FIG. 2). The output current $I_O$ is detected through series resistor R1 and differential amplifier A6. The output voltage $V_O$ is detected through resistors R2 and R3, which form a conventional voltage divider, and differential amplifier A7. The source voltage $V_S$ is detected through rectifying diodes D2 and D3, resistors R4 and R5, which form another voltage divider, and differential amplifier A8. Amplifier A9 drives relay K1 for connecting or disconnecting capacitor C1. The foregoing described components constitute a high-voltage power converter section 20 of a variable lamp power supply with buffer amplifiers forming an interface to a low-voltage control section.

A first digital output signal GATEDRV is provided by the DSP device and applied through amplifier A1 to the gate of switch Q1. Second and third DSP output signals BRDRVA and BRDRVB are applied through amplifiers A2–A5 to the control terminals of H-bridge output transistors Q2–Q5. A fourth DSP output signal CAPDRV is applied through amplifier A9 to relay K1. Four corresponding DSP output signals provide corresponding functions for converter section 22.

Analog signal $V_{IS}$ (provided by differential amplifier A6) represents the magnitude of output current $I_O$, which represents current through the load. Analog signal $V_{OS}$ (provided by differential amplifier A7) represents the magnitude of the output voltage $V_O$ supplied to the H-bridge. Analog input signal $V_{SS}$ (provided by differential amplifier A8) represents the magnitude of the source voltage $V_S$ applied to the input terminals of bridge rectifier BR1. These three analog input signals are provided to the DSP along with three similar analog input signals from the converter section 22. The six analog input signals are multiplexed by multiplexer 37 (FIG. 2) into an analog-to-digital converter 36 (FIG. 2) and the resulting digital values are made available to the CPU 32 (FIG. 2) for processing in accordance with its executable program.

In operation, the DSP 31 is in bidirectional communication with a lighting system controller 40 such as described, for example, in U.S. Pat. No. 4,980,806 or U.S. Pat. No. 5,640,061, which are incorporated by reference. The system controller maintains information regarding the characteristics of lighting loads connected to the outputs of the high-voltage power converter sections. An example load may be an arc lamp requiring square-wave alternating current electrical energy at a particular frequency and regulated at a power level of 400 watts, 600 watts, 750 watts or some other power level. Alternatively, the load may be an incandescent lamp requiring a variable output voltage and current limited to maximum lamp ratings of 500 watts, 1000 watts, 1200 watts or some other power level. Lamp load information of this type can easily be included in a "soft patch" data file associated with a computer-controlled lighting system program. The information can include, for example, a maximum power rating, a nominal voltage rating, and an indicator of type of excitation (square wave, sine wave, pulsating DC, or other). The data file can also cross-reference control channels on a control console to physical address channels in a distributed load network.

Typically, a plurality of electric power converter modules 10 are mounted in a rack-type enclosure that provides AC power and control signal distribution to the various modules. Alternatively, each module could be co-located with its respective load and receive AC power and control signals via appropriate cables. In any system utilizing a plurality of modules, means should normally be provided to route control signals from system controller 40 to the appropriate module 10. This may take the form of an address switch, such as described in U.S. Pat. No. 4,980,806; incorporated into the low-voltage control section 30 of the module 10, or a hard-wired routing scheme such as described in U.S. Pat. No. 5,640,061 may be used. Both of these patents are incorporated by reference. In a rack-type enclosure, each physical position within the rack may be encoded with an electrically-readable address for determining a unique logical channel address for each high-voltage power converter section 20 or 22 in each module 10.

Although specific software implementations may vary, including a variety of known techniques not described here, representative examples of operating methods are described herewith.

Module Control Software

Embedded software, or "firmware," enables the digital signal processor 31 to control two switched-mode high-voltage power converters 20 and 22 sharing the same AC line phase. The firmware regulates the true root mean square (RMS) output voltage, current, or power and provides the ballast function for high-intensity discharge lamps. The input power factor is nearly unity for resistive loads such as incandescent lamps. The firmware manages a serial data link for real-time command and status communication regarding load characteristics, regulation mode, and output level. Preferably, the firmware is stored in the EEPROM portion of memory 33. Alternatively, executable software could be downloaded from a system controller 40 and stored in the RAM portion of memory 33. In another alternative embodiment, the firmware may be permanently written into read-only memory (ROM).

Figure 4:
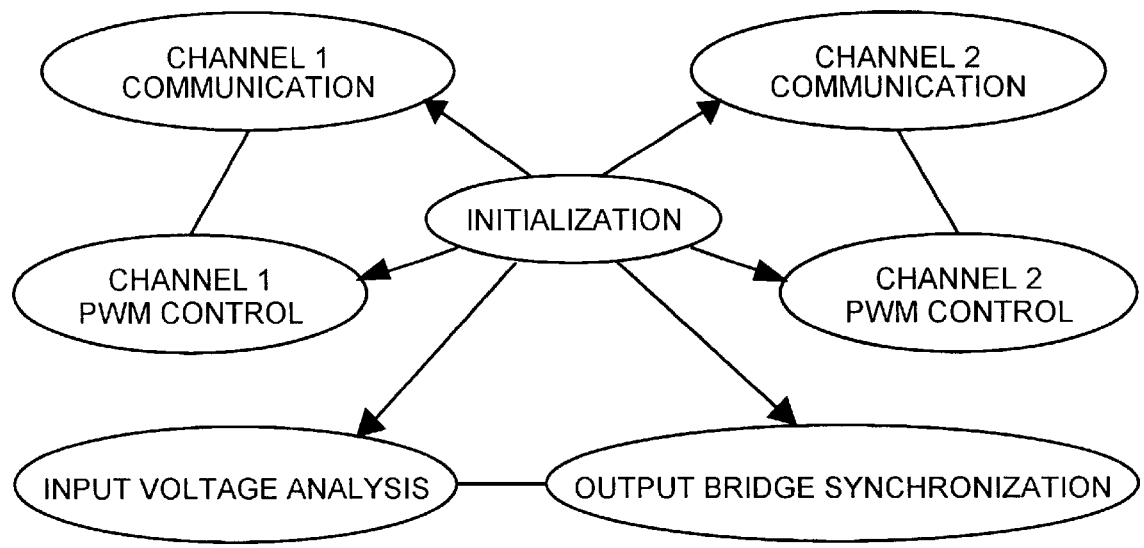
FIGS. 4–9 are flow diagrams of a method for operating the electric power converter module.

The firmware in a preferred embodiment uses a cooperative, multi-tasking architecture as shown in FIG. 4. An initializing sequence of program steps configures the DSP 30 for operation. This sequence sets the internal clock rates, configures general-purpose timers, initializes the ADC 36, and sets-up certain locations in memory 33 for storing operational variables and constants and the readable and writable parameters. The general-purpose timers are used to time the digital pulse-width modulator, the H-bridge output circuit, and control the sample rate generator for the ADC 36. Once DSP 30 has been initialized, six concurrent processes or tasks are started; the concurrent tasks effectively running at the same time. These processes include Channel 1 Communication, Channel 2 Communication, Channel 1 Pulse-Width Modulator Control, Channel 2 Pulse-Width Modulator Control, Input Voltage Analysis, and Output Bridge Synchronization. Variables indicating the operation of these processes are stored in memory 33 and are available to the other processes to allow for coordination. When a task is waiting for input data to be available, it relinquishes control so that other tasks can use CPU 32.

The Channel PWM Control tasks do the actual work of regulating the output of the high-voltage power converters 20 and 22 by calculating the pulse-width duration of each successive PWM cycle. The Channel Communication tasks manage serial data link 42 between each electric power converter module 10 and system controller 42. The Channel Communication task receives input commands such as the desired mode of operation and the desired output level. The Input Voltage Analysis task determines the RMS value and the period of the AC input voltage $V_S$. The Output Bridge Synchronization task, which may be disabled in certain operating modes, operates the H-bridge output circuit in synchronization with the AC input voltage.

Figure 5:
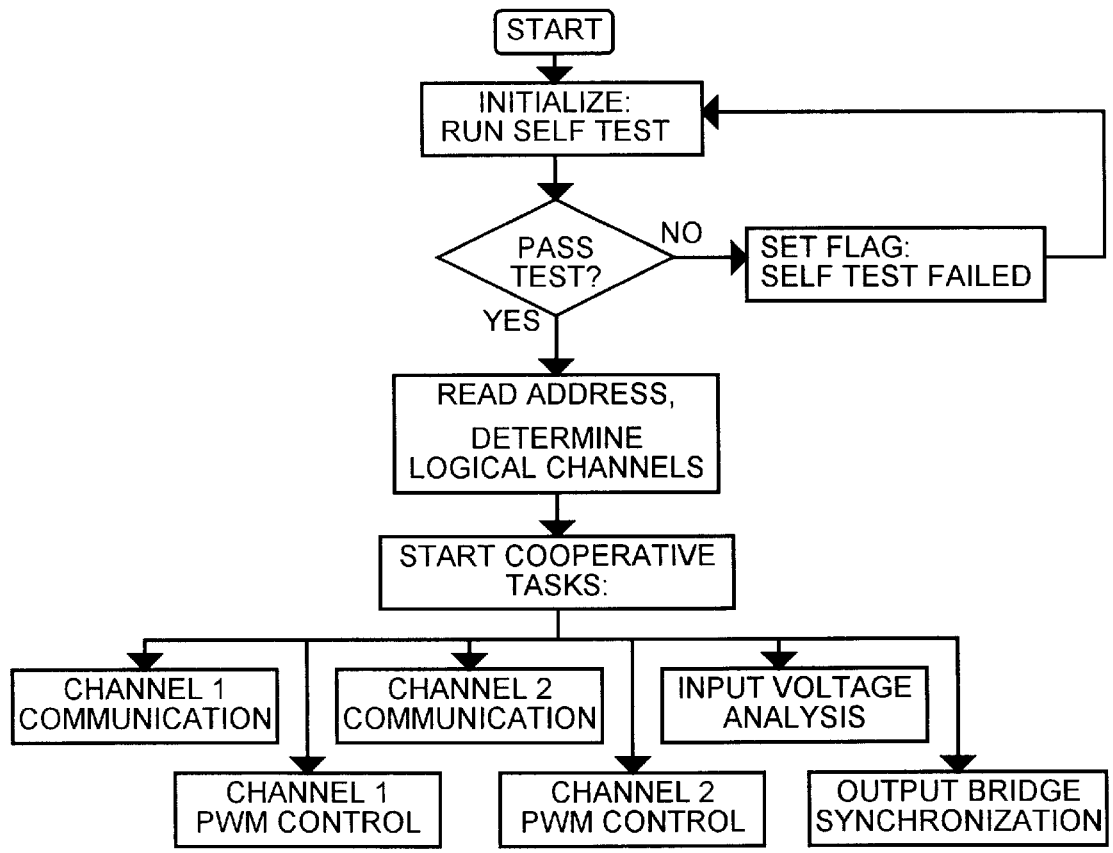

A typical operational sequence begins, as shown in FIG. 5, when power is applied to the module 10 and specifically to the low-voltage control section. At initialization, the DSP 30 performs a self test and determines a unique logical channel for each high-voltage power converter section in the module, preferably by reading the module's physical position in a rack-type enclosure although other addressing schemes can be used. The DSP 30 is configured for operation as described above, and starts the concurrent tasks. Thereafter, each module 10 is prepared to receive transmissions from the system controller 40 and transmit responses as required.

Serial communications

Command transmissions from the system controller 40 can take one of two forms: system commands that are received by all modules or channel commands that are directed to or from a single module 10. The channel command is directed by addressing a unique logical channel identified by a unique channel address. DSP 31 is programmed to respond to command transmissions that include the channel address for either of the two high-voltage power converter sections 20 or 22, or to a system command that includes a special system-wide or "common" address. Command transmissions that require a response transmission from module 10 preferably are excluded from system commands to avoid multiple simultaneous responses from the modules. A command transmission begins with an idle-line event followed by an address, a command code, and one or more arguments. Command transmissions may be of varying lengths framed by idle-line events.

The command interface part of the firmware provides control of high-voltage power converter sections as independent logical channels that are configured for a particular load by writing to the channel's parameters. These parameters are stored in memory 33 of the DSP 30 associated with that channel. All parameters can be read back for verification. A channel's configuration can be locked to help prevent inadvertent parameter changes during operation. Commands to which the module can respond may include commands to Lock Configuration, Unlock Configuration, Reset, Read Memory, Write Memory, Read Parameter, and Write Parameter. Commands to read memory or to read parameter are preferably excluded from system commands. Parameters which can be written may include Peak Current Limit (PCL), Over-Current Release (OCR), Regulation Mode (MODE), Maximum Output Level (MOL), Output Level (OL), Output Intensity (OI), and a proportionality constant $K_p$. All of the writable parameters can be read back. Certain read-only parameters maintained by the DSP can also be read, including a Channel Status, Previous Command Status, Peak Intensity Level, and Input Period.

A system command can be defined so as to direct each argument to a separate channel or to direct each argument to all channels. For example, the Reset command may be sent to all channels in a system command having the common address and one argument—the "reset module" command code, which is then received by all logical channels in the system. A module ignores the "reset module" command if its configuration is locked. Most write parameter commands are also ignored by modules for which configuration is locked, except a command to "write output intensity (OI)." The Output Intensity command provides an alternate means of changing the Output Level parameter such that when Output Intensity is written, the Output Level is set to:

OL=(OI/255)*MOL, a specified percentage of the maximum output level for the logical channel. Output Intensity values therefore correspond to 0–100% of the maximum output level for any channel. An output intensity command can be safely transmitted in a system command addressed to all logical channels in the system, with plural separate arguments each corresponding to and directed towards a separate logical channel.

Figure 6:
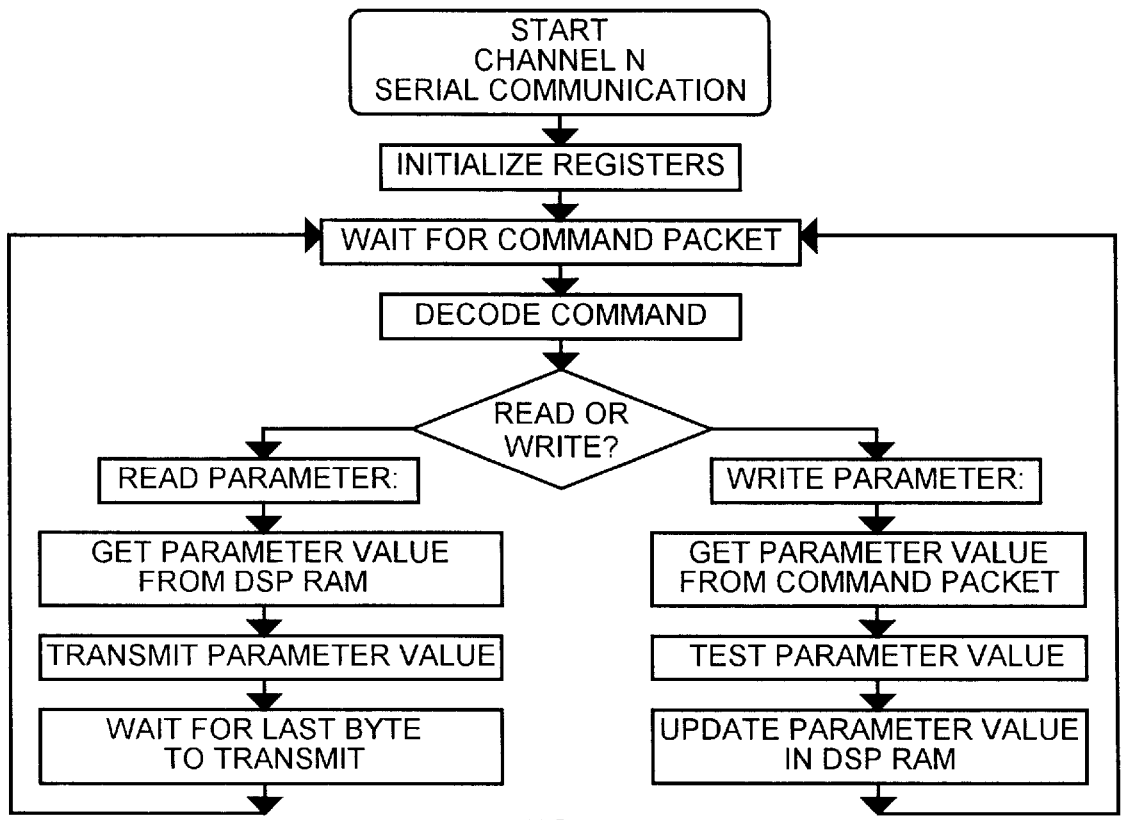

As shown in FIG. 6, the each of two Channel Communication tasks begins by initializing registers to be used for composing and receiving transmissions to and from the system controller. After initialization, the task waits for a command packet addressed either to the one logical channel that the task serves (a Channel Command Packet) or to all logical channels in the system (a System Command Packet). During this wait time, the task relinquishes control of the CPU to other tasks. When a command is received, the task decodes the command as either a read parameter command or a write parameter command. If a read parameter command is received, the task gets the required parameter value from DSP RAM, assembles a transmission packet containing the required response values, and transmits the packet, a Channel Response Packet. The task waits for the last byte of the packet to be transmitted and then returns to a loop that waits for another command packet to be received. If a write parameter command is received, the task gets the parameter value from the command packet, checks the validity of the command and its argument(s) and, if the arguments are valid, stores them in appropriate locations in DSP RAM. If the arguments are invalid, the task sets a flag in a status word that can be reported to the system controller in response to a subsequent read command. The task then returns to a loop that waits for another command packet to be received.

Input voltage analysis

Figure 7:
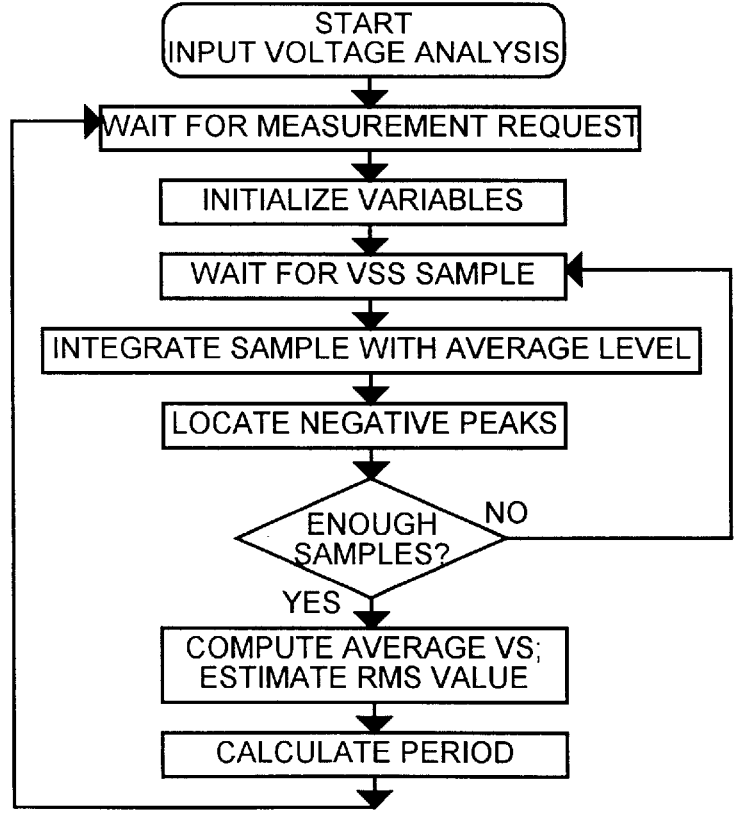

As shown in FIG. 7, the Input Voltage Analysis task begins by waiting for a measurement request from another task. When such a request is received, the task initializes working variables and then waits for a sample of the input line as represented by the signal $V_{SS}$ to be digitized and stored in DSP RAM. Each sample contributes to the value of the average level of input voltage. The CPU calculates the contribution of each sample, which effectively integrates each sample into the average value. The peak negative values of the input voltage are located to determine the period of the input voltage waveform. If there have not been enough samples received to complete the analysis, the task loops back to wait for another $V_{SS}$ sample. If there are enough samples, the task computes the average value of the input voltage and estimates an RMS value, then calculates the period of the input voltage wave form, storing the results in DSP RAM for use by other tasks. Finally, the task loops back to wait for another measurement request.

Channel pulse-width modulator control

Figure 8A:
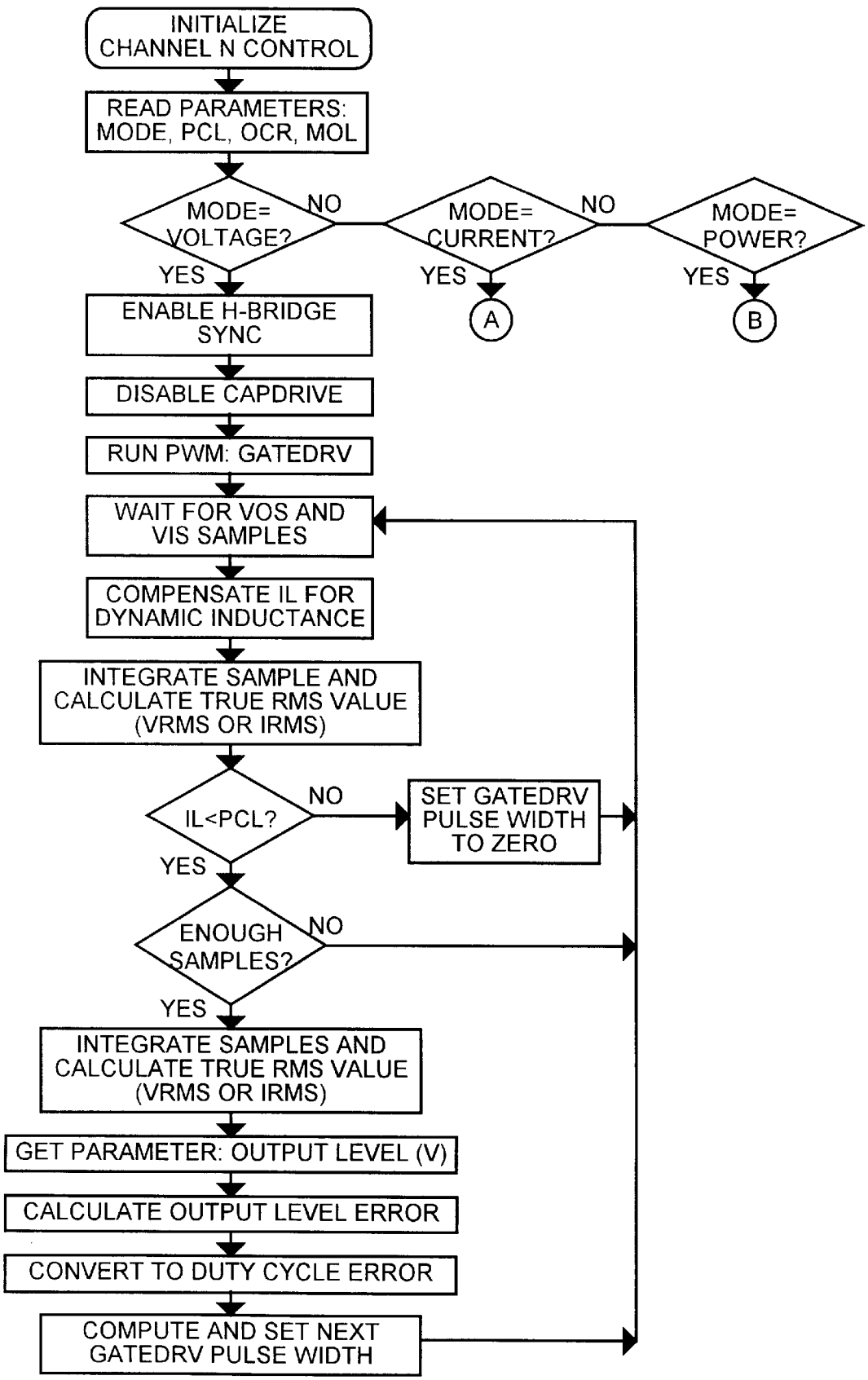
Figure 8B:
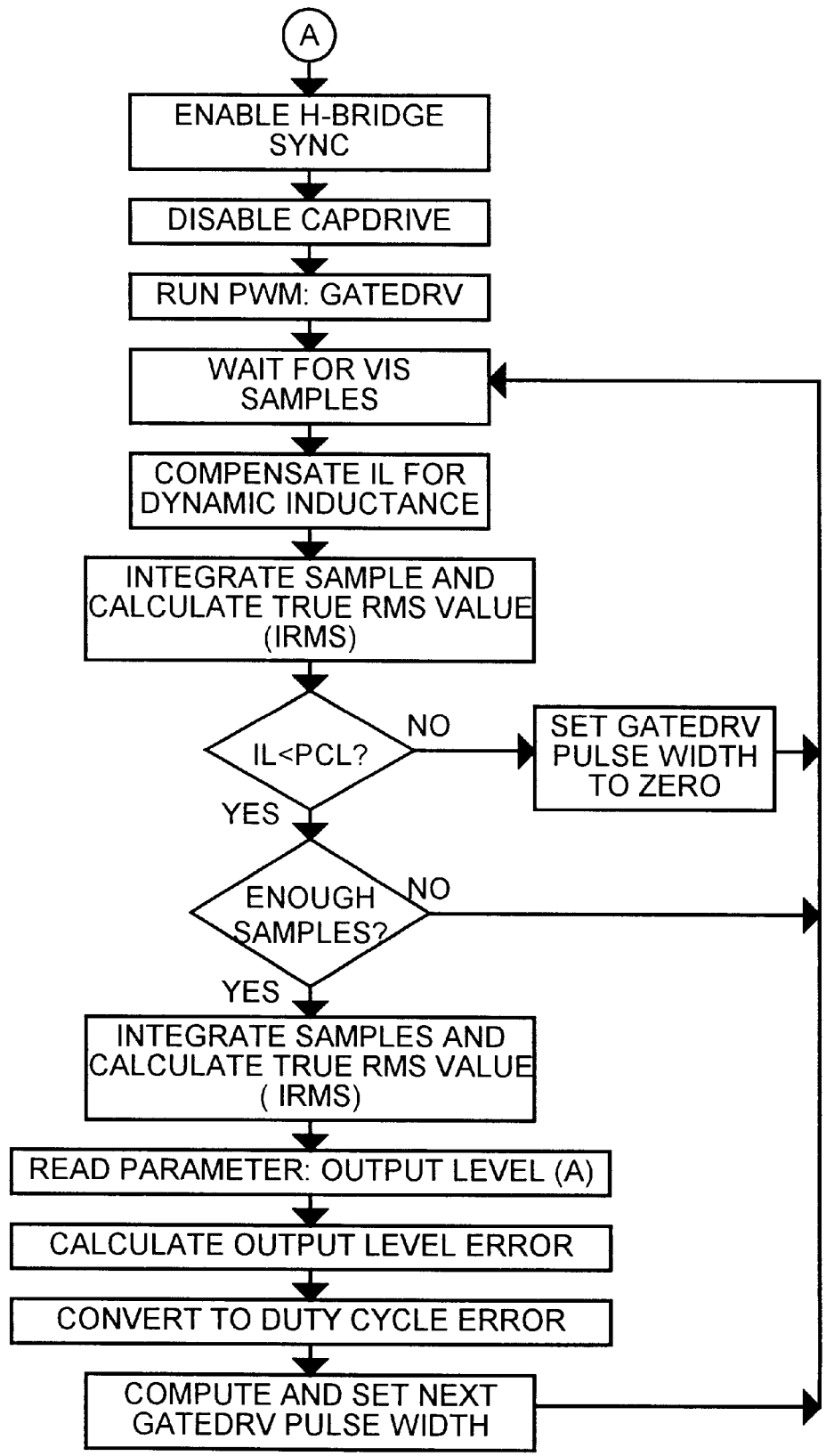
Figure 8C:
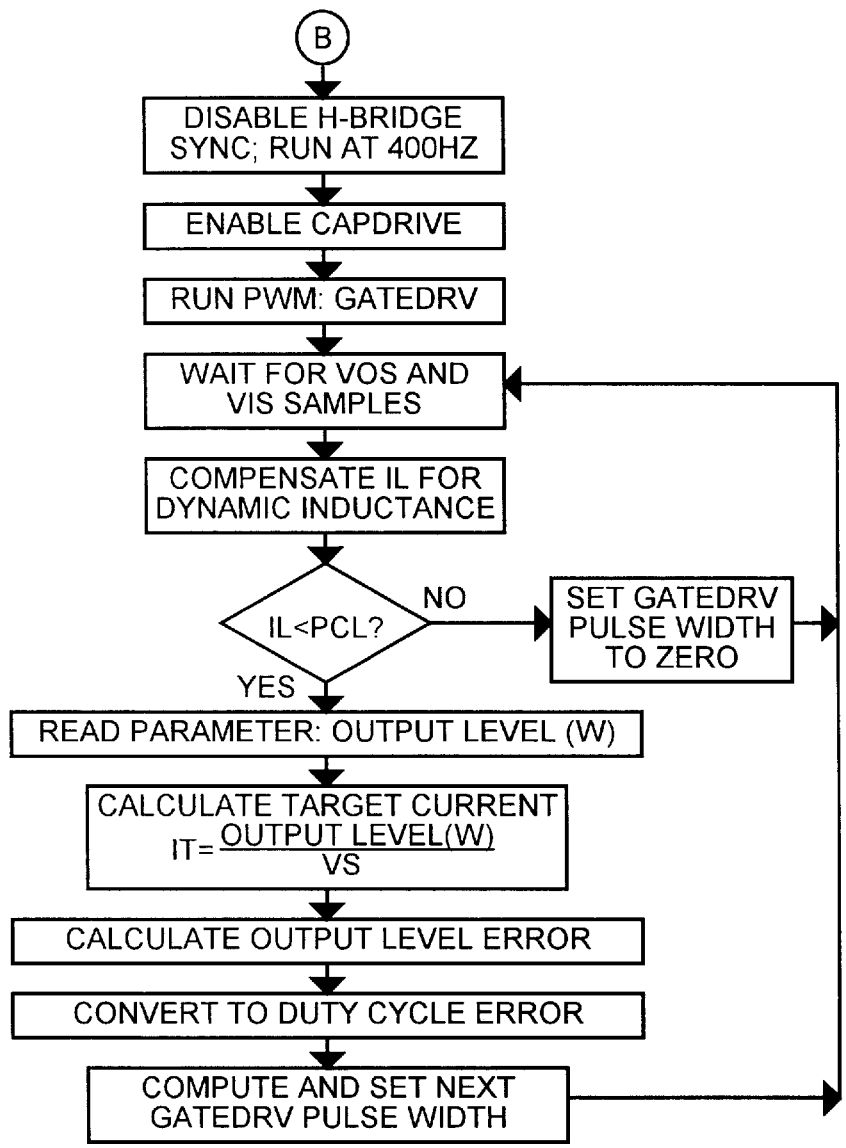

Operation of each high-voltage power converter channel is described with reference to FIGS. 8A–8C. FIG. 8A shows the initialization and operation in voltage-regulation mode. FIG. 8B shows operation in current-regulation mode. FIG. 8C shows operation in power-regulation mode.

All of the writable parameters are initialized (FIG. 8A) to default values at power-up. The default values may all be set to zero so as to prevent inadvertent power output into unknown load conditions. The default regulation mode is preferably voltage mode, which is the most common regulation mode of theatrical lighting power dimmers. Each logical power converter channel is initialized in an unlocked configuration to allow the system controller to write to the writable parameters of all modules to set their respective configurations. The system controller preferably transmits a sequence of channel commands to read all parameters of all modules and verify their configurations prior to locking configuration in another system command. When channel configuration is locked, the only commands that can be accepted are the read parameter (any parameter), write parameter (Output Intensity only), and unlock configuration commands.

To initialize a logical channel for a particular load, the system controller sets the peak current limit (PCL), over-current release (OCR), regulation mode (MODE), and maximum output level (MOL) by writing these parameters to the appropriate module. The Channel Control task reads these parameters to determine its mode of operation and operational limits.

The regulation mode, in a preferred embodiment, can be set to one of three modes depending upon the value written to the regulation mode parameter: voltage mode, current mode, or power mode. The selection of a particular regulation mode preferably implies certain constraints upon other writable parameters and upon certain other operational characteristics of the module and its logical channels. For example, selection of the voltage mode or the current mode may imply sinusoidal output obtained by disconnecting capacitor C1 from the output of bridge rectifier BR1, while selection of the power mode may imply square-wave output obtained by connecting capacitor C1 to the output of the bridge rectifier. Selection of the voltage mode necessarily implies that the maximum output level and the output level be expressed in volts; for example, 120 V. Selection of the current mode implies that these two levels be expressed in amperes; for example, 10 A. Selection of the power mode implies that these two levels be expressed in watts; for example, 700 W. Selection of a particular regulation mode may also determine certain default values. An example is the value of proportionality constant $K_p$. Other operational characteristics of the module and its logical channels are also set by the selection of the regulation mode. An example of this is output frequency, which is preferably synchronized with the AC line in voltage and current modes but which may be set to a fixed frequency in power mode regulation.

Other regulation modes implying other operational characteristics may be implemented in alternate embodiments; for example, a unidirectional output may be regulated in an alternate voltage mode or in an alternate current mode for controlling DC motors or other DC loads. In another alternate embodiment, certain other operational characteristics may be specified by writable parameters; for example, the output frequency of square-wave outputs.

The system controller may preferably maintain a database of all loads in the system, referenced by their logical channel assignments and identifying the type of load by a common name or acronym. The various writable parameters applicable for each different type of load are preferably maintained by the system controller software and referenced by a corresponding common name or acronym. When the system is initialized, the appropriate parameters are automatically written to the various logical channels of all the modules 10 in the system without an operator having to directly set each channel appropriately. With such a database maintained by the system controller 40, the DSP devices 31 in each of the modules 10 are relieved of the task of interpreting a load-type identifier and of the responsibility of maintaining data defining the parameters and operational characteristics the various loads.

Voltage-regulation mode

Voltage regulation is accomplished using a hybrid state/proportional-integral-differential (PID) control algorithm. The pulse-width modulator duty cycle is set to a value that is proportional to the output level (voltage) error plus the integral of the error plus the derivative of the error. The error is the difference between the desired level and the measured level. The duty cycle may be forced to zero depending upon the state of certain other measured parameters such as input voltage (too low) or output current (too high).

Figure 3:
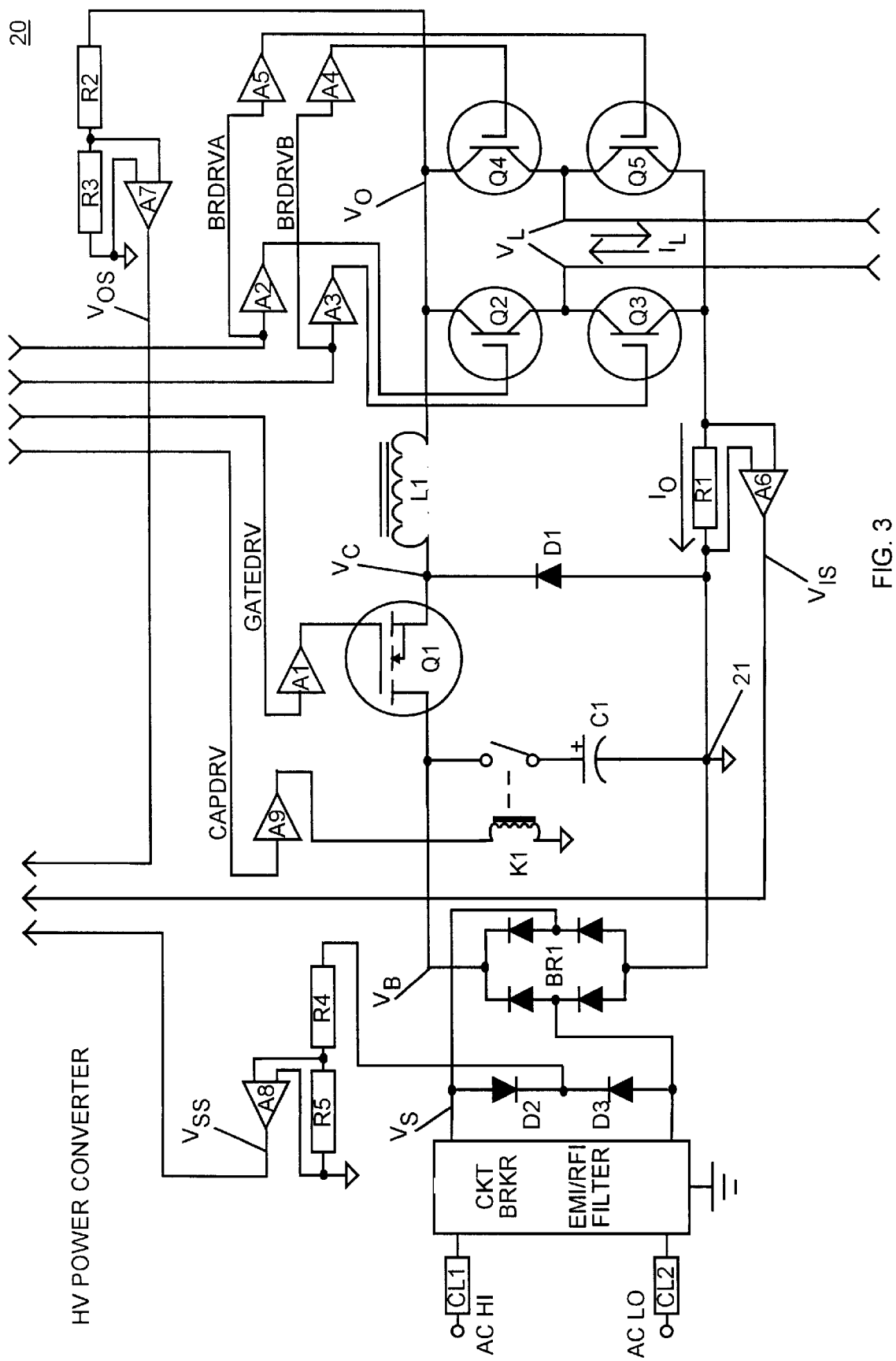
FIG. 3 is a schematic diagram of a high-voltage power converter section according to a preferred embodiment.

As shown in FIG. 8A, the Channel Control task reads operational parameters and tests the MODE parameter to determine the desired operating mode. In voltage-regulation mode, H-bridge Synchronization is enabled, this function being accomplished by the Output Bridge Synchronization task (FIG. 4, FIG. 9), and the CAPDRIVE signal is reset to disconnect capacitor C1 to the output of bridge rectifier BR1 (FIG. 3). The pulse-width modulator is run using drive signals from one of the general-purpose timers in the DSP. The task then waits for samples of the output current, represented by the signal $V_{IS}$, and for samples of the output voltage, represented by the signal $V_{OS}$. The DSP 31 samples the output current and voltage at a high rate, 20 kHz for example. The samples are digitized using A/D converter 36. The resulting values are stored in memory 33 for use by the Channel Control task. Each Channel Control task compensates the sampled value of the output current $I_O$ to account for dynamic inductance of the choke L1, which varies substantially according to the DC current in the choke. Each sample contributes to the value of the average level of output current. The CPU calculates this contribution, which effectively integrates each sample into the average value. The task then compares the RMS value of the output current to the value of the Peak Current Limit (PCL) parameter. If the output current is not less than the PCL, the pulse-width of the GATEDRV signal is set to zero and the task loops back to wait for more samples of $V_{OS}$ and $V_{IS}$.

If the output current is less than the PCL value, the task then determines whether enough samples have been taken. Integration of $V_{OS}$ and $V_{IS}$ requires samples over a sufficiently long period of time (such the period of the input voltage $V_S$) to produce a reliable indication of the output level. If there have not been enough samples, the task loops back to wait for more samples of $V_{OS}$ and $V_{IS}$. If there have been enough samples, the task integrates these samples and calculates the true RMS value of the output voltage $V_O$ over the previous input voltage cycle. The Channel Control task then gets the value (in volts) of the Output Level (OL) parameter from memory 33. It then calculates the output level error between the commanded level and the measured level and converts this error to a PWM duty cycle error. This PWM duty cycle error is then used to compute and set the pulse-width for the next GATEDRV pulse. Finally, the task loops back to wait for more samples of $V_{OS}$ and $V_{IS}$.

Current-regulation mode

Current regulation is also accomplished using a hybrid state/proportional-integral-differential (PID) control algorithm. The pulse-width modulator duty cycle is set to a value that is proportional to the output level (current) error plus the integral of the error plus the derivative of the error. The duty cycle may be forced to zero depending upon the state of certain measured parameters such as input voltage (too low) or output current (too high).

In current-regulation mode, as shown in FIG. 8B, the task executes the same sequence of steps as in voltage-regulation mode, except that the samples of $V_{OS}$ representing the output voltage are ignored, and the Output Level (in amperes) is computed on the basis of the output current $I_O$ represented by $V_{IS}$.

Power-regulation mode

Power regulation is accomplished using a hybrid state/proportional-differential (PD) control algorithm. The pulse-width modulator duty cycle is set to a value that is proportional to the output level (a target current) error plus the derivative of the error. The duty cycle may be forced to zero depending upon the state of certain measured parameters such as input voltage (too low) or output current (too high).

In power-regulation mode, as shown in FIG. 8C, the task executes a similar sequence of steps to the current and voltage regulation modes with the following exceptions. The Output Bridge Synchronization task is disabled and the output bridge frequency is set to a pre-determined value that is independent of the AC line frequency. The CAPDRIVE signal is set to connect capacitor C1 to the output of bridge rectifier BR1. Samples of both output voltage sense signal $V_{OS}$ and output current sense signal $V_{IS}$ are used. The output level (OL) parameter is read in watts. Output power is regulated by calculating a target current ($O_T$) based on the ratio of the Output Level parameter (in watts) and the instantaneous output voltage $V_O$, as described below. In this way, current measurements are used to regulate power without actually calculating a power level. The proportional-differential control algorithm does not calculate true RMS values (i.e. with samples integrated over 16–20 ms). Therefore, it does not perform the steps of calculating the contribution of each sample to the average value nor integrating a large number of samples to calculate a true RMS value of the measured output level. Instead it determines an output level error for each buck cycle (every 50 μs). The choice of PID or PD regulation modes is mainly due to the update frequency of the control loops. The voltage and current modes need to update based on the true RMS output value over a relatively long time (16–20 ms). Thus integration is required. Since the power mode has a short update interval (50 μs), integration is not necessary. Many slow control systems (10's of ms update interval) require the integration in order to minimize the long-term "steady-state" error. The rapid, small updates in power mode effectively minimize steady-state error without integration. Finally, the task loops back to wait for more samples of $V_{OS}$ and $V_{IS}$.

Output bridge synchronization

Figure 9:
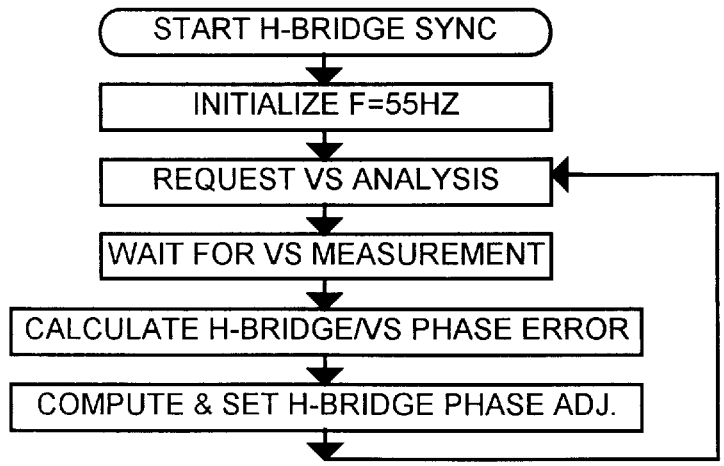

The Output Bridge Synchronization task, as shown in FIG. 9, initializes with a bridge frequency of 55 Hz, midway between the two most-commonly expected line frequencies of 50 Hz or 60 Hz. The task then requests analysis of the input voltage from the Input Voltage Analysis task (FIG. 4, FIG. 7), and waits for the measurement of $V_S$ period to become available. The task calculates the phase error between $V_S$ and the H-bridge operating frequency, which is 55 Hz initially but may be some other value later in operation of the power converter. The task then computes a phase adjustment value for synchronizing the H-bridge with the input line, and sets this value for the general-purpose timer that generates the bridge drive signals BRDRVA and BRDRVB. Finally, the task loops back to request another measurement of $V_S$. The sequence is repeated to keep the cycle of the output bridge synchronized with the AC line input voltage.

Sine-wave Operation

Figure 10A:
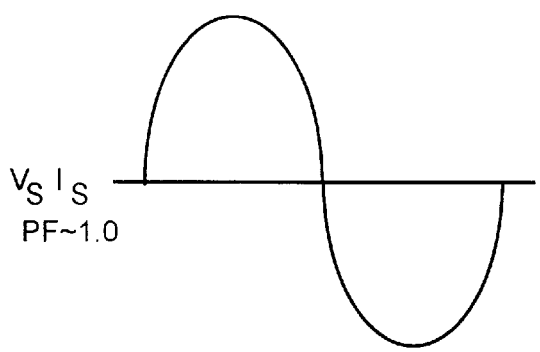
FIGS. 10A–10E are graphs showing representative wave forms illustrating the operation of the lamp power supply in a first mode.
Figure 10B:
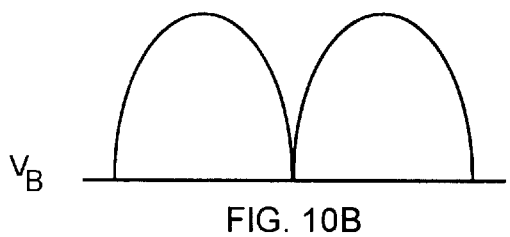
Figure 10C:
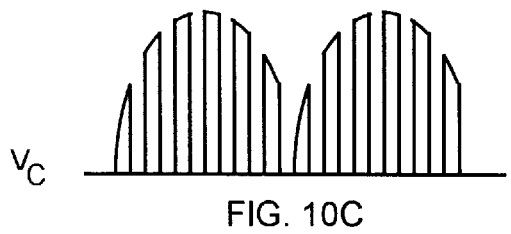
Figure 10D:
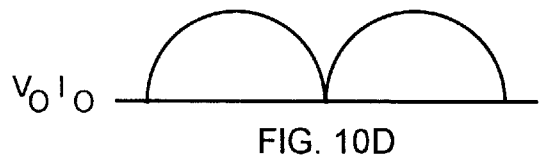
Figure 10E:
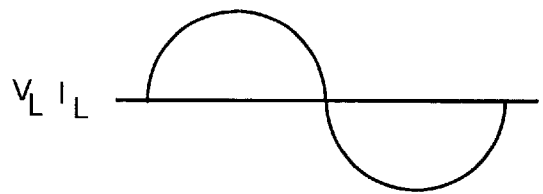

In voltage-regulation or in current-regulation modes, the high-voltage power converter provides sine wave alternating current electrical energy to, for example, an incandescent lamp. The DSP executes the multiple, concurrent tasks as described above with reference to FIGS. 4–9. The DSP senses the source voltage $V_S$ (FIG. 10A), calculates and stores the RMS value and period thereof in RAM. The DSP does not energize relay K1 thereby leaving capacitor C1 out of the circuit so as to eliminate certain harmonic distortions in the input current, thereby improving the power factor of the converter. As shown in FIG. 10A, the input current wave form ($I_S$) is substantially the same as the input voltage wave form ($V_S$) the input current wave form being both in phase with and proportional to the input voltage wave form, so that the power factor (PF) is practically 1.0 (unity). The voltage $V_B$ at the output of rectifier BR1 is therefore presented to the FET switch Q1 as pulsating DC (FIG. 10B). If $V_S$ is within the acceptable range, the DSP runs the PWM signal GATEDRV, which operates FET switch Q1 to charge inductor L1 at $V_C$ (FIG. 10C). The DSP monitors the output voltage $V_O$ (FIG. 10D) as represented by the analog signal $V_{OS}$ (or the output current $I_O$ represented by $V_{IS}$ in current-regulation mode) to measure the magnitude of the electrical energy delivered to the load. Finally, the output bridge Q2–Q5 is operated as an inverter at line frequency to deliver a sine wave output to the load at $V_L$ (FIG. 10E).

Square-wave Operation

Figure 11A:
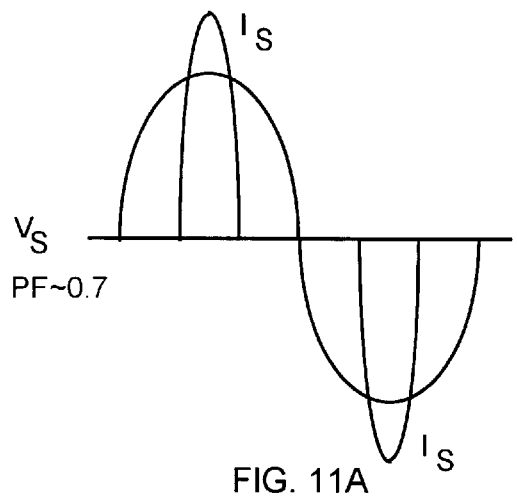
FIGS. 11A–11E are graphs showing representative wave forms illustrating the operation of the lamp power supply in a second mode.
Figure 11B:
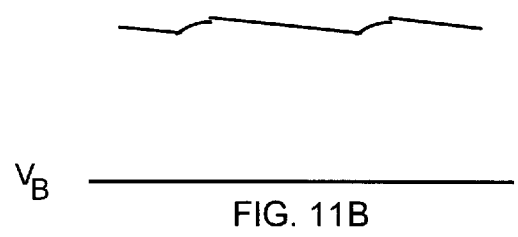
Figure 11C:
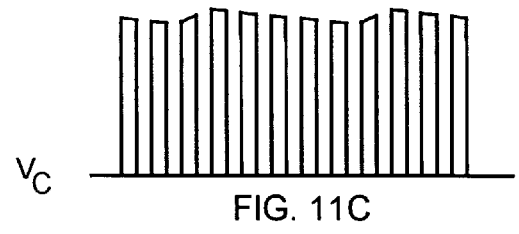
Figure 11D:
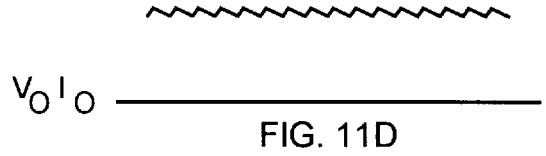
Figure 11E:
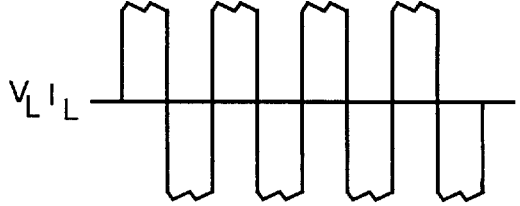

In power-regulation mode, the high-voltage power converter provides square-wave alternating current electrical energy to a load; for example, an arc lamp. The DSP executes the multiple, concurrent tasks as described above with reference to FIGS. 4–9. The DSP senses the source voltage $V_S$ (FIG. 11A), calculates and stores the RMS value and period thereof in RAM. The DSP energizes relay K1 connecting capacitor C1 to the output of rectifier BR1 at $V_B$ (FIG. 11B). With capacitor C1 so connected, with input current waveform $I_S$, as shown in FIG. 11A, is no longer proportional to the input voltage waveform $V_S$. The input current waveform contains substantial harmonic distortion with respect to the input voltage waveform due to the presence of capacitor C1 in the circuit. Thus, the power factor (PF) has a value closer to 0.7. The DSP runs the PWM signal GATEDRV, which operates FET switch Q1 to charge inductor L1 at $V_C$ (FIG. 11C). The DSP monitors the output current 10 represented by the analog signal $V_{IS}$ (FIG. 11D) to measure the magnitude of the electrical energy delivered to the load. Finally, the output bridge Q2–Q5 is operated as an inverter at greater than line frequency to deliver a square-wave output to the load at $V_L$ (FIG. 11E).

Power regulation method

Traditionally, the power level would be detected using a multiplier circuit that combines a voltage-sensing signal and a current-sensing signal to develop a power-sensing signal, as described in U.S. Pat. No. 5,640,061. If implemented digitally, this approach requires a "duty cycle versus power" table for time-consuming interpolation of the duty cycle error, which is a non-linear relationship. However, a more efficient method of power regulation, in terms of time and space requirements, is to compute the ratio of commanded power level to instantaneous output voltage and produce a target output current level. Multiplying the commanded power level with the reciprocal of the instantaneous output voltage most efficiently performs the computation. This avoids the need for two table interpolations and subtracting, which increases the calculation speed. Thereafter, the duty cycle error is a simple linear function of the current error. This linearizes the control loop, which is important for stability, without the need for non-linear calculations or a non-linear table, both of which are relatively time-consuming. So power is regulated without ever calculating a power level.

Current measurement method

Because the current waveform is triangular and asymmetrical, the standard practice in analog-to-digital conversion requires a high sampling rate to attempt to capture the full wave shape of each cycle corresponding to each pulse of the buck converter, which includes several harmonics. This data could then be used to calculate the average output current. However, even the highest sampling rate of the DSP would yield only a coarse representation of the wave form, comprising only a few samples per cycle, and therefore a relatively large error in the computed average. Also, the DSP would not be able to handle the data for more than one logical channel comprising a single high-voltage power converter section.

Figure 12A:
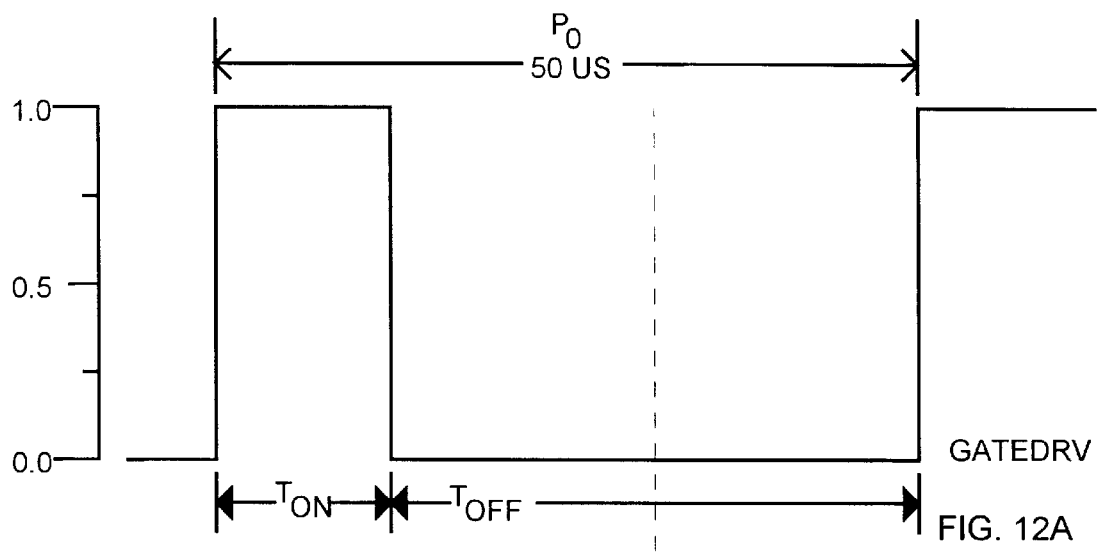
FIGS. 12A and 12B are graphs showing representative wave forms illustrating a current measurement technique.
Figure 12B:
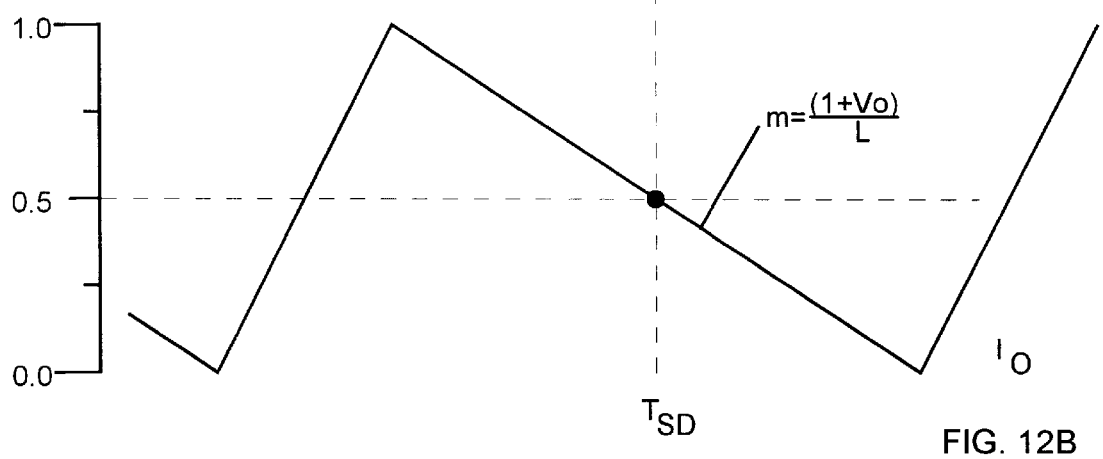

However, in the preferred embodiment, the low-voltage control section 30 samples the instantaneous output current $I_O$ and the instantaneous output voltage $V_O$ once per buck cycle at a fixed time ($T_{sd}$) after the turn-off (trailing edge) of the buck converter drive signal GATEDRV (FIG. 12A). During the off phase, the current slope m is always $(1+V_O)/$ L, or one plus the output voltage, the sum divided by the inductance of inductor L1. Since both the rising and falling portions of the current waveform have linear slope, the true average is indicated by the midpoint of the falling portion (FIG. 12B). Once the slope m is calculated, the true average current is calculated as:

$$I_O'=I_O+(T_{sd}-T_{off}/2)*m.$$

Note that $T_{off}=(1-D)*P_o$ where D is the duty cycle ratio of the previous buck pulse, and $P_o$ is the buck cycle period; for example, 50 μs for a 20 kHz switch-mode frequency.

This scheme is complicated somewhat by the fact that L varies substantially according to the DC current in the inductor. However, if the formula for calculating the percentage of initial permeability versus magnetizing force is known for a specific inductor, a table can be generated that relates inductance (L) to load current $I_L$. The function is non-linear, but the table does not require interpolation, making it fast to use. This table is loaded into memory 33.

Good noise immunity is achieved by always sampling well after the trailing edge of the buck converter drive signal GATEDRV and before the output bridge switches. This avoids the effects of large transients induced by those transitions. This method of measuring output current provides temporal resolution approximately equivalent to that of a 20 MHz sampling rate, even though the input sampling rate is only 20 kHz. The use of instantaneous current input and this method has been shown to achieve an acceptable current ripple envelope during arc lamp operation, and enables a single DSP device to serve more than one logical channel comprising a high-voltage power converter section such as the section 20.

Unidirectional Operation

In another mode of operation, the relay K1 may be left de-energized thus removing the filter capacitor C1 from the circuit as described above for incandescent lamp operation. Also, the H-bridge output circuit is turned on in one phase only such that transistors Q2 and Q5 are turned on while transistors Q3 and Q4 are turned off. This provides unidirectional, pulsating direct current energy to the load. Alternatively, the H-bridge output can be turned on in an opposite phase such that transistors Q3 and Q4 are turned on while transistors Q2 and Q5 are turned off to provide pulsating direct current energy of an opposite polarity to the load.

Power supply control software, for example the aforementioned firmware, facilitates stable operation of the high-voltage power supply section within safe operational limits of the components thereof and within the limits of the load, providing specific voltage, current, power and timing control dependent upon the load connected. A recent history of the power delivered to the load may be compiled in associated memory and may influence the control software's response to input commands. The power supply control software includes safe operation routines that compare actual sensed circuit parameters to expected parameters. These parameters are compared to maximum and minimum operating ranges to detect wiring faults or the connection of inappropriate loads. In the event of operator error or mechanical failure, the safe operation routines intervene to minimize the possibility of catastrophic damage to the load, distribution wiring, or power and control circuitry.

Information feedback software may provide a system operator with facts related to the loads connected to the supply systems, including warnings indicating out-of-range conditions resulting from opens, shorts or misconnected loads. Information concerning component temperatures or lamp life times may also be generated and sent to the operator.

An Alternative Embodiment

Figure 13:
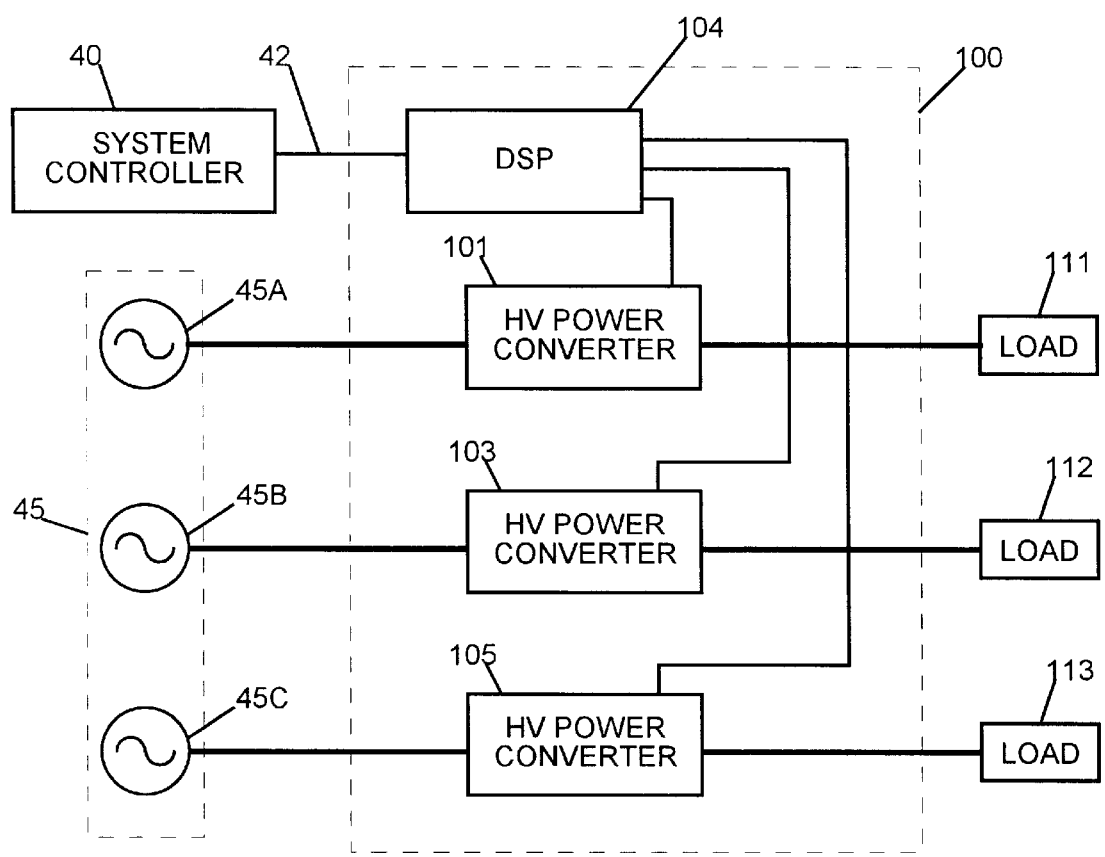
FIG. 13 is a block diagram of another electric power converter system according to an alternate embodiment.

In an alternative embodiment, shown in FIG. 13, simplified high-voltage power converter sections are controlled by a single low-voltage control section. An electric power converter apparatus 100 includes high-voltage power converter sections 101–103 and a low-voltage control section 104. The apparatus 100 is connected to a system controller 40 by a bi-directional serial digital data link 42. Each high-voltage power converter section 101–103 is fed from a three-phase electric power source 45, preferably in the range of 208–277 Vac, such that one converter section 101 is fed from one phase 45A of the power source, another of converter section 102 is fed from a second phase 45B of the power source, and another of converter sections 103 is fed from a third phase 45C of the power source. Each high-voltage power converter section 101–103 provides regulated electric power to its own respective load 111–113.

Each high-voltage power converter section 101–103 is functionally identical to the high-voltage power converter section 20 shown in FIG. 3 except that the capacitor C1, relay K1, amplifier A9, H-bridge output circuit comprising transistors Q2–Q5 and amplifiers A2–A5 are omitted, and the load is coupled to inductor L1 and resistor R1. Each high-voltage power converter section delivers unidirectional pulsating direct current energy to a load such as an incandescent lamp. The resulting circuit and operates as a power dimmer for incandescent lamps. Since the H-bridge output circuit is omitted, amplifiers A2–A5 driving the transistors Q2–Q5 are no longer required. Since the circuit now delivers only unidirectional pulsating direct current energy to a load, the capacitor C1 is no longer required; neither are the relay K1 nor the amplifier A9 driving the relay required.

The low-voltage control section 104 is functionally similar to the low-voltage control section 30 shown in FIG. 1 and FIG. 2, and operates in a very similar way except that certain logical operations are eliminated. With the H-bridge output circuit eliminated from the high-voltage power converter sections, a DSP in the low-voltage control section is relieved of certain tasks associated with H-bridge synchronization and has physical resources such as internal timers which were formerly occupied by driving the H-bridge output circuits, but which may now be utilized to drive additional buck converter stages contained within additional high-voltage power converter sections.

Preferably, a DSP operating in low-voltage control section 104 would have sufficient input/output circuits, internal memory (such as RAM, for example), and a sufficiently high clock rate for its CPU and analog-to-digital converters to operate the simplified high-voltage power converter sections in power-regulation mode. Thus, there would be sufficient resources within a DSP-based control section 104 to operate, for example, three simplified high-voltage power converters 101–103 operating as power dimmers for incandescent lamps from a single DSP. A six-channel design in which pairs of simplified high-voltage power converters are fed from the same phase of a three-phase electric power source would be possible if a DSP controlling all six channels provides sufficiently fast analog input conversion. Simultaneous conversion of six to twelve analog inputs would be a significant advantage in implementing the particular current measurement technique described above with reference to FIG. 12A and FIG. 12B. Also, a conversion-start mechanism which places all sample points (not just the first) with 50 ns precision would improve the current ripple for all channels beyond the first.

The electric power converter apparatus 100 and variants thereof may be used advantageously and economically in lighting systems having a significant number of loads requiring unidirectional electric power while retaining many of the benefits of the previously described electric power converter module 10, such as remote configuration of operating mode and reporting of measured performance parameters, among others.

Although specific embodiments of the present invention are disclosed herein, they are not to be construed as limiting the scope of the present invention. Many other embodiments will become apparent to those skilled in the art in light of this specification. For example, although the use of a DSP is disclosed, other devices may be capable of performing the described functions of the DSP. The scope of the invention is only limited by the claims appended hereto.

We claim:

1. An electric power converter, comprising:
    a rectifier for coupling to a power source, said rectifier having first and second rectified output terminals, said second rectified output terminal being connected to a first output terminal;
    a first switch having a first and second current handling terminals and a control terminal, said first current handling terminal being coupled to said first output terminal of said rectifier;
    an inductor having first and second terminals, said first terminal being connected to said second terminal of said electronic switch and said second terminal being connected to a second output terminal;
    a diode having a cathode coupled to said second terminal of said electronic switch and an anode coupled to said second terminal of said rectifier;
    a current sensor coupled in series with said inductor;
    a voltage sensor for sensing the voltage between said first and second output terminals; and
    a controller having a data processor, said controller having a first input terminal coupled to said current sensor, a second input terminal coupled to said voltage sensor, a first output terminal providing a first control signal coupled to said control terminal of said first switch, said controller controlling electrical energy applied to said first and second output terminals.

2. The electric power converter of claim 1, further comprising at least one capacitor having a first terminal connected to said second terminal of said rectifier and a second terminal coupled through a second switch to said first terminal of said rectifier, said second switch having a control terminal coupled to a second output terminal of said controller, said second output terminal of said controller providing a second control signal.

3. The electric power converter of claim 1, further comprising a voltage sensor coupled to said power source, said voltage sensor being further coupled to a third input terminal of said controller.

4. The electric power converter of claim 1 wherein said first switch is a transistor.

5. The electric power converter of claim 1 wherein said controller is a digital signal processor.

6. The electric power converter of claim 1 wherein said first control signal is a pulse width modulated signal.

7. The electric power converter of claim 1 wherein said current sensor measures current between said second terminal of said rectifier and said first output terminal.

8. The electric power converter of claim 1 wherein said controller maintains a selected current level provided on said first and second output terminals.

9. The electric power converter of claim 1 wherein said controller maintains a selected voltage level provided on said first and second output terminals.

10. The electric power converter of claim 1 wherein said controller maintains a selected power level provided on said first and second output terminals.

11. The electric power converter of claim 8 wherein said selected current level is as measured using the root mean square method.

12. The electric power converter of claim 9 wherein said selected voltage level is as measured using the root mean square method.

13. The electric power converter of claim 10 wherein said selected power level is as measured using the root mean square method.

14. An electric power converter, comprising:
    a rectifier for coupling to a power source, said rectifier having first and second output terminals;
    a first switch having a first and second current handling terminals and a control terminal, said first current handling terminal being coupled to said first output terminal of said rectifier;
    an inductor having first and second terminals, said first terminal being connected to said second terminal of said first switch;
    a diode having a cathode coupled to said second terminal of said electronic switch and an anode coupled to said second terminal of said rectifier;
    a second switch having a control terminal, a first current handling terminal coupled to said second terminal of said inductor and a second current handling terminal connected to a first output terminal;
    a third switch having a control terminal, a first current handling terminal coupled to said second terminal of said inductor and a second current handling terminal connected to a second output terminal;
    a fourth switch having a control terminal connected to said control terminal of said third switch, a first current handling terminal coupled to said second terminal of said rectifier and a second current handling terminal connected to said first output terminal;
    a fifth switch having a control terminal connected to said control terminal of said second switch, a first current handling terminal coupled to said second terminal of said rectifier and a second current handling terminal connected to a second output terminal;
    a current sensor coupled in series with said inductor;
    a voltage sensor for sensing the voltage between said second terminal of said inductor and said first current handling terminal of said fourth switch; and
    a controller having a data processor, said controller having a first input terminal coupled to said current sensor, a second input terminal coupled to said voltage sensor, a first output terminal providing a first control signal coupled to said control terminal of said first switch, a second output terminal providing a second control signal coupled to said control terminal of said second switch and a third output terminal providing a third control signal coupled to said control terminal of said third switch, said controller controlling electrical energy applied to said first and second output terminals.

15. The electric power converter of claim 12 wherein said first, second, third, fourth and fifth switches are transistors.

16. The electric power converter of claim 12 wherein said controller is a digital signal processor.

17. The electric power converter of claim 14 wherein said first control signal is a pulse width modulated signal.

18. The electric power converter of claim 14 wherein said second and third control signals are alternately turned on to provide an alternating current output on said first and second output terminals.

19. An electric power converter, comprising:

a full-wave bridge rectifier for coupling to a power source having first and second output terminals;

a first transistor having a first and second current handling terminals and a control terminal, said first current handling terminal being coupled to said first output terminal of said rectifier;

an inductor having first and second terminals, said first terminal being connected to said second terminal of said first transistor;

a diode having a cathode coupled to said second terminal of said electronic transistor and an anode coupled to said second terminal of said rectifier;

a second transistor having a control terminal, a first current handling terminal coupled to said second terminal of said inductor and a second current handling terminal connected to an first output terminal;

a third transistor having a control terminal, a first current handling terminal coupled to said second terminal of said inductor and a second current handling terminal connected to a second output terminal;

a fourth transistor having a control terminal connected to said control terminal of said third transistor, a first current handling terminal coupled to said second terminal of said rectifier and a second current handling terminal connected to said first output terminal;

a fifth transistor having a control terminal connected to said control terminal of said second transistor, a first current handling terminal coupled to said second terminal of said rectifier and a second current handling terminal connected to a second output terminal;

a current sensor coupled in series with said inductor;

a voltage sensor for sensing the voltage between said second terminal of said inductor and said first current handling terminal of said fourth transistor; and a digital signal processor having a data processor, said controller having a first input terminal coupled to said current sensor, a second input terminal coupled to said voltage sensor, a first output terminal providing a first control signal coupled to said control terminal of said first transistor, a second output terminal providing a second control signal coupled to said control terminal of said second transistor and a third output terminal providing a third control signal coupled to said control terminal of said third transistor, said controller controlling electrical energy applied to said first and second output terminals.

20. A method for performing electric power conversion, comprising the steps of:

operating a current switch of a buck converter using a pulse width modulated signal provided by a controller;

measuring the voltage applied by said buck converter and providing the measurement to said controller;

measuring the current supplied by said buck converter and providing the measurement to said controller;

adjusting the pulse width of the pulse width modulated signal provided by said controller in response to said current measurement, said voltage measurement and characteristics of the load connected to the output of said buck converter, said characteristics being stored in said controller.

21. A method for performing electric power conversion as in claim 20, wherein said current is measured by a method including the steps of:

sampling an instantaneous output current and an instantaneous output voltage once per buck cycle at a fixed time after a trailing edge of said pulse width modulated signal;

calculating a current slope 'm' as one plus said output voltage, the sum divided by an inductance value of an inductor coupled in series between said buck converter and a load;

calculating a current correction value as IC={[TSD−(1−D)*P]/2}*m, wherein TSD is a sample delay time between a leading edge of said pulse width modulated signal and a time at which said instantaneous output current is sampled, D is a duty cycle of a previous cycle of said pulse width modulated signal, and P is a period of said pulse width modulated signal;

calculating a true average output current as said instantaneous output current plus said current correction value IC.

22. A method performing electric power conversion as in claim 21, wherein said inductance value is corrected for variations according to a magnitude of direct current through said inductor by reference to a table of data relating inductance to load current.

23. A method for performing electric power conversion as in claim 20 wherein said controller is a digital signal processor.

24. A method for performing electric power conversion as in claim 20 wherein said controller maintains a selected RMS current level provided by said buck converter.

25. A method for performing electric power conversion as in claim 20 wherein said controller maintains a selected RMS current voltage provided by said buck converter.

26. A method for performing electric power conversion as in claim 20 wherein said controller maintains a selected RMS current power level provided by said buck converter.

27. A method for performing electric power conversion as in claim 24, further including the steps of:

receiving a commanded power level from an external controller;

calculating a reciprocal of said voltage applied by said buck converter;

multiplying said commanded power level by said reciprocal of said voltage to produce a target output current level;

adjusting said pulse width of said pulse width modulated signal to reduce an error between said current measurement and said target current output level.

28. A method of performing electric power conversion, comprising the steps of:

storing, in an electronic memory, characteristics of an electric load device;

rectifying an alternating-current input line voltage;

filtering a rectified input line voltage in dependence upon stored characteristics of said load device;

controlling a high-speed electronic switch by pulse-width modulation of a control terminal of said switch in dependence upon stored characteristics of said load device;

controlling an electrical-bridge output driver connected to said load device by complementary oscillating signals applied to control terminals of controllable conductive elements of said bridge and in dependence upon stored characteristics of said load device;

sensing electrical parameters, including output current provided to said load and output voltage provided to said load, of said output driver and adjusting the pulse-width modulation of said electronic switch in dependence upon said sensed output current and output voltage.

29. The method of claim 28, further comprising the steps of sensing an input line voltage and synchronizing oscillating signals applied to said control terminals of said controllable conductive elements of said bridge in dependence upon said sensed input line voltage.

* * * * *